United States Patent Office 3,313,003
Patented Apr. 11, 1967

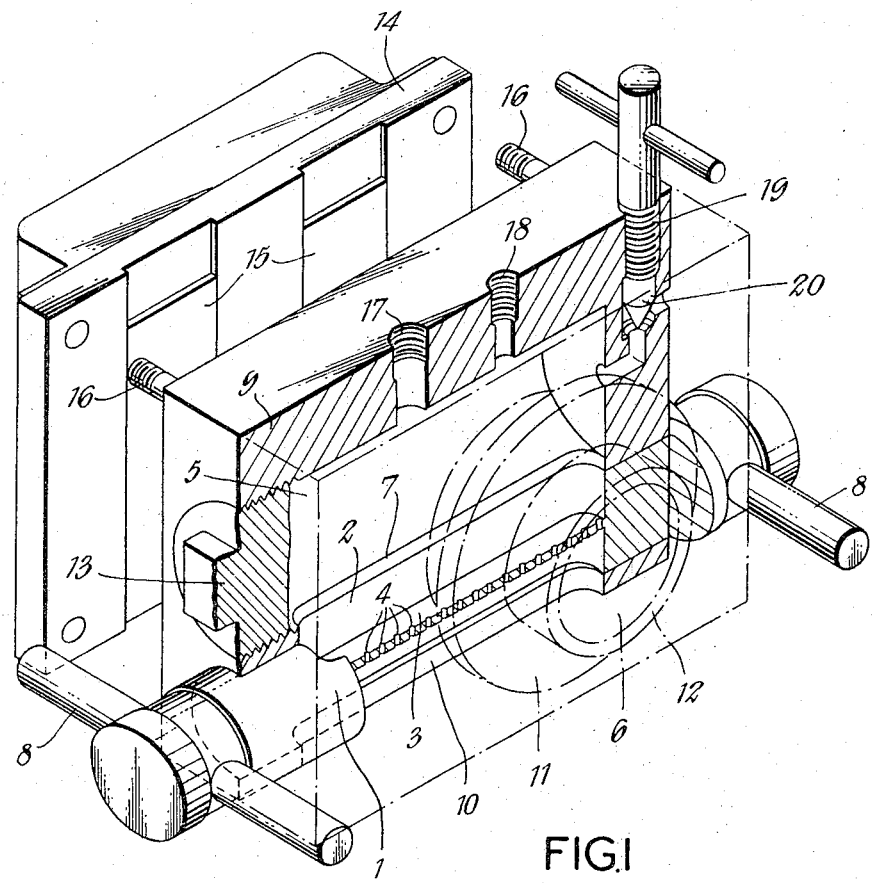
FIG.I

3,313,003
EXTRUSION DIES FOR PLASTIC MATERIALS
John Vincent O'Brien, Poulton, England, assignor to Brown and Williamson Tobacco Corporation, Louisville, Ky., a corporation of Delaware
Filed Oct. 2, 1964, Ser. No. 401,172
Claims priority, application Great Britain, Oct. 4, 1963, 39,224/63
3 Claims. (Cl. 18—12)

This invention concerns improvements relating to dies for use with machines for the extrusion of fine filaments or thin films of plastic materials, for example reconstituted tobacco compositions.

In screw extruders used in the synthetic plastics industry, a breaker plate and fine-mesh screen are commonly fitted between the extruder screw and the die. The screen, usually supported by the breaker plate, serves to remove from the molten material undesirable solid particles which could block the fine holes in the die. The plate and screen together present a considerable resistance to the passage of the material thereby increasing the pressure developed over the length of the screw and the amount of shear work performed on the material by the screw. Thus, more precise control of the performance of the screw and greater homogeneity of the material are obtainable.

In some extrusion processes, it is necessary or preferable to dispense with the breaker plate and/or the screen. For example, in cases in which the screen would rapidly become blocked, causing frequent stoppages for the replacement of the screen, and in cases in which the pressure across the die is necessarily high, as with the extrusion of fine filaments, the use of a breaker plate and/or screen would be superfluous and uneconomic.

In the case of a die for fine filaments, however, omission of the screen involves risk of the blockage of the fine holes in the nozzles by large particles or foreign matter. This could cause serious interference with the continuity of the extrusion process. It is an object of the present invention to provide means by which this difficulty can be avoided.

According to the invention, a die head for an apparatus, particularly screw extruding apparatus, for the extrusion of fine filaments or thin films of plastic material comprises a chamber for receiving the material to be extruded. A nozzle holder carrying a symmetrical-nozzle assembly therein is rotatable within and in relation to the chamber so that the direction of the nozzle or nozzles in relation to the direction of flow of the material being extruded can be reversed for the purpose of clearing blockages from the said nozzle or nozzles.

Figure 3:
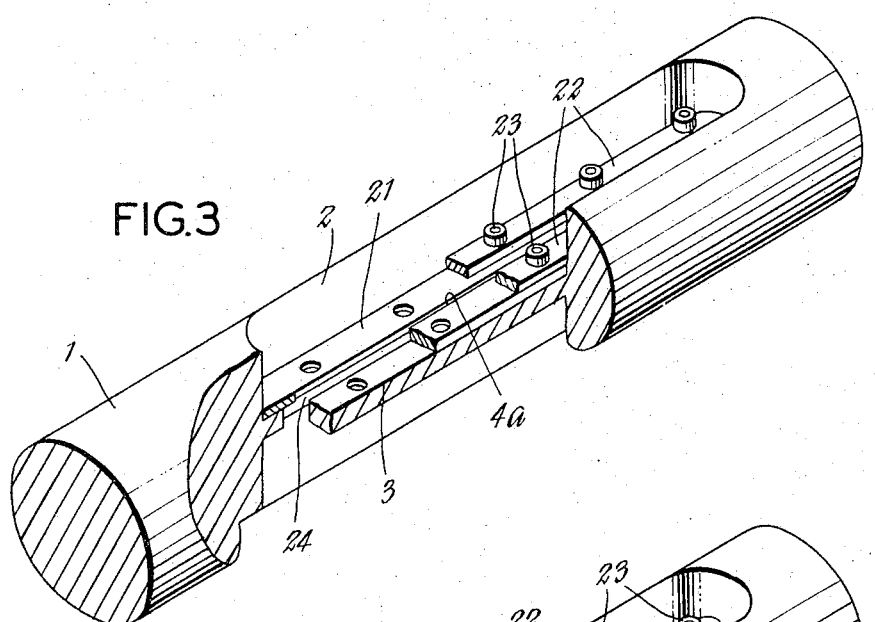
Figure 2:
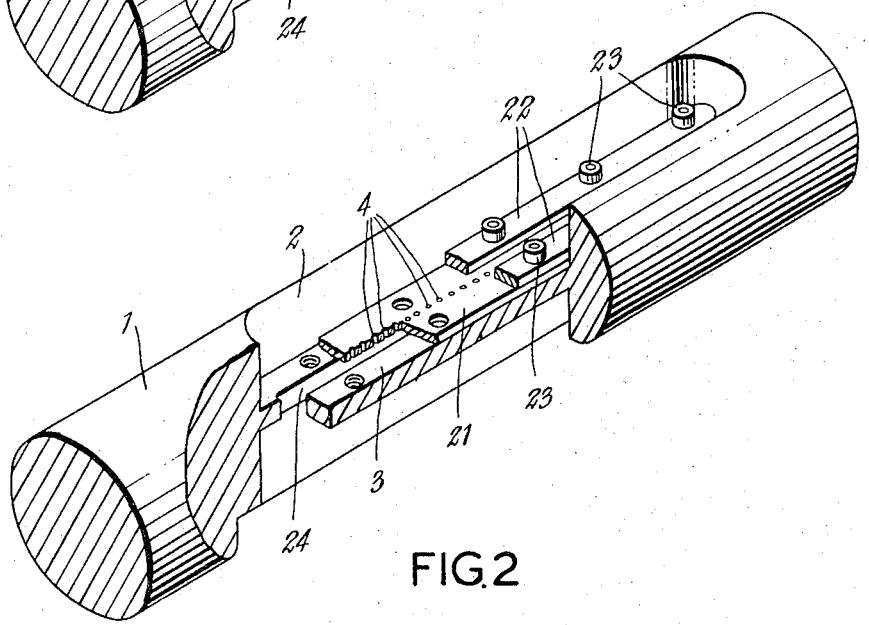

One embodiment of the invention by way of example, devised more particularly for the extrusion of fine threads of a plastic mass such as a tobacco composition, will now be more fully described with reference to the accompanying drawings, in which:

FIGURE 1 is an isometric view, partially in vertical section and partially exploded, of a die head, and FIGURES 2 and 3 are isometric views, partially in section, of two modified forms of nozzle holder.

In the example illustrated, the nozzle holder 1 comprises a length of cylindrical metal bar having a slot 2, for example ¾" in width, cut through it axially along part of its length. A symmetrical-nozzle assembly, in the form of a transverse partition 3 is provided within the slot 2. The partition 3 may be formed integrally with the holder 1 or may be connected to the holder at substantially the mid-depth of the slot 2, for instance by welding. As illustrated, in FIG. 2, a plurality of fine nozzles are defined by small holes 4, which may be circular orifices of approximately 10 thousandths of an inch in diameter. The holes are perforated in a thin metal plate 21, which may be approximately 1/10" in thickness. The nozzle holder 1 is rotatable about an axis extending transversely of the axes of the nozzles. This rotation is in relation to an upper chamber 5 (FIGURE 1) into which the pressure element of the extruder, e.g. a screw (not shown), forces the extrudable material through a front opening 6 shown in phantom lines in FIGURE 1. The slot 2 is arranged to coincide with a similar slot 7 at the bottom of the chamber 5 in two symmetrical, diametrically opposite positions. The nozzle holder 1 may be moved from one position to its diametrically opposite symmetrical position by the removable bars 8.

In the conveient form shown in FIGURE 1, the chamber 5 is a horizontal cylindrical cavity extending longitudinally of a rectangular block 9, the nozzle holder 1 being rotatable in a cylindrical bore located immediately below the said cavity and parallel thereto. A slot 10, also of the same shape as the slot 2, in the bottom of the block 9 forms an outlet through which the extruded material is discharged downwardly into the open. Connection to the extruder screw by way of the opening 6 in one longitudinal side wall of the block 9 is established with the aid of a flanged connection ring 11 and sleeve 12. One end of the chamber 5 is closed by a screw plug 13 which can be removed to permit cleaning of the chamber. A heater plate 14 in which electrical heating elements 15 are mounted can be secured to the other longitudinal side wall of the block 9 by bolts 16. Tapped holes 17, 18 for the introduction of pressure-measuring and temperature-measuring devices (not shown) and a tapped hole 19 for a pressure-release valve 20 are provided in the top of the block 9.

In use, the material received under pressure in the chamber 5 is extruded through the nozzles 4 as threads. When blockage occurs in one or more of the nozzles, the extruder screw is stopped and the nozzle holder 1 is turned through 180°, so that, in relation to the nozzles 4, the direction of flow through the nozzles is reversed. When the screw is restarted, any blockage is cleared by the forcing of the blocking particles back along the previous path of entry thereof and such particles are carried away with the extruded threads. The turning can be repeated, whenever blockage occurs, with only momentary interruption of the continuous extrusion process.

Thus, a simple and convenient self-clearing nozzle assembly is provided from which blockages can be rapidly and readily removed.

To enable the nozzle assembly to be readily and economically replaced when the nozzles 4 become worn, the holes forming the said nozzles may be formed in a separate nozzle plate 21 which, as shown in FIGURE 2, is secured to the partition 3 by means of clamping strips 22 and screws 23. The nozzles thus secured overlie a wide slot 24 in the partition 3 in the nozzle body 1, which can be turned to reverse the flow of extrudable material through the nozzles 4, as previously described.

FIGURE 3 illustrates a similar arrangement but with a continuous nozzle slot 4a or slots instead of the round nozzle holes 4, so that a thin film or films will be extruded instead of fine threads.

Thus it is seen that the objects and advantages of the present invention are carried out. It will also be appreciated that other objects and advantages are accomplished by the above described invention, the scope of which is defined by the appended claims.

I claim:
1. A die head extruding apparatus for extruding plastic material comprising a body having a chamber that is adapted to receive under pressure said material to be extruded and a substantially cylindrical bore, a nozzle holder having a substantially cylindrical portion rotatably mounted within said chamber bore between a first position and a second position, said holder having a slotted intermediate portion, a separate nozzle assembly mounted across the slotted intermediate portion and dividing said chamber into an upper and a lower chamber section and having means for passing the extrudable material from said upper chamber section to said lower chamber section, said nozzle assembly being rigidly connected within said holder, and means for rotating said holder approximately 180° between said first and second position in relation to said chamber whereby the direction of the nozzle assembly in relation to the direction of flow of said extrudable material is diametrically reversed thereby to clear blocking material from said nozzle.

2. A die head according to claim 1 wherein said means for passing the extrudable material from said upper chamber section to said lower chamber section being defined by a longitudinal slot formed in said nozzle assembly.

3. A die head according to claim 1 wherein said means for passing the extrudable material from said upper chamber section to said lower chamber section being defined by a plurality of nozzle holes formed in said nozzle assembly and in communication with the slotted intermediate portion in said holder.

References Cited by the Examiner

UNITED STATES PATENTS

| | | | |
|---|---|---|---|
| 2,310,587 | 2/1943 | MacNeill | 210—411 |
| 2,487,910 | 11/1949 | Waddell et al. | 18—12 |
| 2,740,157 | 4/1956 | McCurdy et al. | 18—12 |
| 2,771,636 | 11/1956 | McIntosh et al. | 18—12 |
| 3,059,276 | 10/1962 | Yokana | 18—12 |
| 3,146,494 | 9/1964 | Sponaugle | 18—12 |

WILLIAM J. STEPHENSON, *Primary Examiner.*